(12) United States Patent
Benveniste

(10) Patent No.: US 7,433,670 B2
(45) Date of Patent: Oct. 7, 2008

(54) DELIVERY OF BUFFERED FRAMES TO POWER SAVING STATIONS IN WIRELESS LOCAL AREA NETWORKS

(75) Inventor: Mathilde Benveniste, South Orange, NJ (US)

(73) Assignee: Avaya Inc., Basking Ridge, NJ (US)

( * ) Notice: Subject to any disclaimer, the term of this patent is extended or adjusted under 35 U.S.C. 154(b) by 611 days.

(21) Appl. No.: 11/091,057

(22) Filed: Mar. 28, 2005

(65) Prior Publication Data

US 2005/0213534 A1    Sep. 29, 2005

Related U.S. Application Data

(60) Provisional application No. 60/556,877, filed on Mar. 29, 2004, provisional application No. 60/563,803, filed on Apr. 21, 2004.

(51) Int. Cl.
   *H04B 1/16* (2006.01)
   *H04B 7/185* (2006.01)
   *H04B 7/00* (2006.01)
   *H04Q 7/20* (2006.01)
   *H04Q 7/24* (2006.01)
   *H04J 3/16* (2006.01)

(52) U.S. Cl. ............ 455/343.2; 370/318; 370/338; 370/346; 455/41.2; 455/522

(58) Field of Classification Search ........ 370/318, 370/338, 346; 455/574, 343.1, 343.2, 343.5, 455/41.2, 522

See application file for complete search history.

(56) References Cited

U.S. PATENT DOCUMENTS 6,404,772 B1    6/2002    Beach et al. ........... 370/443
7,245,946 B2 *  7/2007    Liu ........................ 455/574
2005/0018624 A1 * 1/2005  Meier et al. ............ 370/318

FOREIGN PATENT DOCUMENTS

EP    1 349 320 A2    10/2003

OTHER PUBLICATIONS

"Draft Amendment to Standard [for] Information Technology—Telecommunications and Information Exchange Between Systems—LAN/MAN Specific Requirements—Part 11: Wireless Medium Access Control (MAC) and Physical Layer (PHY) specifications: Medium Access Control (MAC) Quality of Service (QoS) Enhancements", IEEE Standards Department, 2003.
European Search Report, published Jul. 8, 2003.

* cited by examiner

*Primary Examiner*—George Eng
*Assistant Examiner*—Un C Cho
(74) *Attorney, Agent, or Firm*—Chapin IP Law, LLC; David W. Rouille, Esq.

(57) ABSTRACT

A method and apparatus for conveying priority of buffered frames to power saving stations in a Wireless Local Area Network (WLAN) including an Access Point (AP) and at least one power saving station is presented. The method and apparatus indicate to a station the presence of at least one buffered frame in at least one of legacy buffers and Automatic Power Save Delivery (APSD) buffers in the AP for the station. The AP receives an indication from the station that the station is ready to receive at least one of the buffered frames for the station. The AP then selects a buffer for releasing at least one buffered frame to the station, determines a number of frames to transmit from the selected buffer, and transmits the number of frames from said buffer to the station.

14 Claims, 4 Drawing Sheets

DELIVERY OF BUFFERED FRAMES TO POWER SAVING STATIONS IN WIRELESS LOCAL AREA NETWORKS

CROSS REFERENCE TO RELATED APPLICATIONS

The present application claims the benefit of U.S. Provisional Patent Application No. 60/556,877, filed on Mar. 29, 2004, and U.S. Provisional Patent Application No. 60/563,803, filed on Apr. 21, 2004 both of which are incorporated herein by reference.

BACKGROUND

A wireless local area network (WLAN) typically includes an Access Point (AP) and one or more stations. Each station may be a device such as a notebook computer, personal digital assistant (PDA), wireless Voice over Internet Protocol (VoIP) telephone or the like that transmits radio signals to and receives radio signals from other stations in the local area network via the AP.

APs and stations transmit data in units referred to as frames over a shared-communications channel. Frames transmitted from a station to an AP are referred to as uplink frames, and frames transmitted from an AP to a station are referred to as downlink frames. In a situation where two or more stations (or an AP and a station) transmit frames simultaneously, then one or more of the frames can become corrupted, referred to as a collision. As a result, WLANs typically employ one or more protocols to ensure that a station or AP can gain exclusive access to the shared-communications channel for a predetermined interval of time in order to transmit its frames without collisions occurring. Certain wireless network protocols (e.g., Institute of Electrical and Electronics Engineers [IEEE] 802.11, etc.) provide for the AP to periodically broadcast a special frame called a beacon that can be heard by the stations in the BSA (basic service area), the area covered by the AP. The beacon contains a variety of information that enables the stations to establish and maintain communications in an orderly fashion, such as a timestamp, which enables stations to synchronize their local clocks, and signaling information (e.g., channel number, frequency hopping pattern, dwell time, etc.).

A station can prolong its battery life by powering off its radio when not transmitting or receiving. When a station powers off its radio, the station is said to enter the "doze" state. A station wakes up from the doze state by powering on its radio to enter the "awake" state. While a station is in the doze state, it cannot transmit or receive signals, and is said to be asleep. A station that saves battery life by alternating between alert states and doze states is said to be in power save (PS) mode, and a station that employs PS mode is said to be a power saving station.

While a station is asleep, the AP buffers any downlink frames for the station for eventual delivery when station is in the awake state.

One method for receiving buffered frames is described in the IEEE 802.11-1999 standard, and is referred to herein as the "legacy" power save method. In this method, an AP periodically includes a Traffic Indication Map (TIM) in the beacon to identify which stations in power-save mode have downlink frames waiting in the AP's buffer for transmission.

In accordance with legacy power save method, stations in the doze state wake up to receive beacons and check the TIM. If the TIM indicates that there are frames buffered for the station, the station will send a PS Poll to request delivery of a buffered frame. To use PS polls, a station listens to the TIM in a beacon to determine if the AP has buffered frames for the station. When there are buffered frames for the station at the AP, the station sends a PS Poll to the AP signaling to the AP that the station is awake and waiting to receive a buffered frame. The AP sends a buffered frame to the station. If the frame has the "More Data" bit set to 1, indicating that there are more buffered frames for the station, the station will send another PS Poll to get another buffered frame. This is repeated until the AP has no more frames for the station.

When the TIM indicates that there are no buffered downlink frames for a station, the station goes back into the doze state. In addition, a station in the doze state buffers uplink frames generated by the application layer, and transmits one or more of the buffered uplink frames upon wake-up.

Another strategy for delivering buffered packets in the AP to the appropriate station is known as Automatic Power Save Delivery (APSD), wherein the delivery of downlink buffered frames occurs without the need for PS Polls to indicate that the PS station is awake and ready to receive transmitted frames. There are two types of APSD: (i) scheduled APSD and (ii) unscheduled APSD. The two APSD variants differ with respect to initiation of the 'service period', which is the time period during which the PS station is presumed awake and able to receive a frame transmitted by the AP. With scheduled APSD, the service period starts automatically—that is, without special signaling frames to notify the AP that a station is awake and ready to receive frames. With unscheduled APSD, the transmission of an uplink frame is sufficient to signal the start of the service period, i.e., that the station is awake and ready to receive transmitted frames. The unscheduled service period begins when the AP receives from the station a Quality of Service (QoS) Data/Null frame. The station may elect to limit the Access Category (AC) of the frame that may initiate a service period. The AC(s) of the frames that may initiate a service period are designated by the station to through signaling such as an APSD TSPEC.

Another feature of APSD relates to the termination of the service period, the time interval a PS station must remain awake. Unlike legacy power save, where a PS station may go to sleep after receiving a single frame from the AP, APSD requires a PS station to stay awake to receive several buffered frames, and go to back to sleep only when it is notified by the AP. The AP sets the EOSP (end of service period) bit to 1 in the last frame it transmits in order to signal to the station that it will not transmit any more frames downlink until the next service period. This signals the station that it can go back to sleep.

SUMMARY

Conventional mechanisms such as those explained above suffer from a variety of deficiencies. One such deficiency is that with the QoS protocol, 802.11e, there are insufficient fields to indicate the priority of the frames buffered. Certain devices, having urgent tasks to be performed, may wish to know this priority for the proper scheduling of the retrieval of buffered frames relative to other tasks.

According to the unscheduled APSD power delivary mechanism specified in IEEE 802.11e Draft 8.0, the AP transmits all buffered frames during a service period, before the power-saving station may go to sleep. The More Data bit, when set to 0, would indicate that all frames were transmitted. This can result in at least two problems. One problem is priority inversion. If the AP must transmit the contents of the APSD buffer to the power-saving station before transmitting any frames to other stations, lower-priority frames for the power-saving station would be transmitted before higher priority frames to other stations.

Another problem associated with unscheduled APSD method as proposed to date is battery exhaustion, which may occur when the AP interrupts transmission to a power-saving station in order to transmit higher priority frames to other stations; it could keep the station awake too long.

Conventional legacy power save is inefficient. PS polls are inefficient to use if long packet bursts are buffered, as a PS poll is needed for every frame. Exiting and returning to power save mode is inefficient for independently arriving frames, as it involves two extra frames for each buffered frame that is retrieved. One cannot tell which is the right legacy option to use because a TIM cannot indicate how much traffic is buffered.

One could add priority-specific TIMs in the beacon, and extend the QoS control field to make room for priority-specific More Data bits in order to provide the priority of buffered traffic. This, however, is deemed impractical.

Further, systems employing the unscheduled APSD method as proposed to date does not efficiently retrieve non-periodic bursty traffic, as the definition of the TIM is limited to a subset of buffered frames only, those whose delivery relies on the legacy power save mechanism. Frames to be retrieved through unscheduled APSD would not be included in the TIM.

Embodiments of the invention significantly overcome such deficiencies and provide mechanisms and techniques for conveying priority of buffered frames to power saving stations in a WLAN. Embodiments of the invention indicate priority of the buffered frames and the queue size Knowing the priority of the buffered frames enables the station to decide whether to send a frame to retrieve buffered frames waiting at the AP, or to perform other time-critical functions. Knowing the queue size enables the station to decide which power save option to pursue; that is, it enables the station to decide whether the use a PS poll or exiting and returning to power save mode. Another aspect of the presently disclosed invention relates to the meaning of the TIM and More Data bits. The TIM and More Data bit must reflect all buffered traffic, not only traffic to be retrieved by the legacy power save method. As a consequence; the unscheduled APSD method has been enhanced to deal with both periodic and non-periodic traffic. Another aspect of the present invention is that it allows the AP to determine the end of service period, as it deems appropriate. It achieves that by the EOSP bit and the generalized TIM and More Data bit definitions, which notifies the station of the presence of frames remaining buffered once the EOSP bit is set by the AP before the buffer is emptied. The prior specification of the Unscheduled APSD method caused priority inversion (or causes stations to consume more power), and could not be used by many applications (i.e. nonperiodic traffic); these applications must use the less efficient legacy power save. Yet another aspect of the invention is that a frame of any access category (AC) can serve as the trigger frame. The AC buffer from which frames will be released is not restricted to be the same as the AC of the trigger frame. The AP would typically release frames from the highest priority AC that contains buffered frames. Another aspect of the presently disclosed invention relates to the ability of the station to restrict the length of the service period and to mark uplink frames that cause the start of a service period for a power saving station.

In a particular embodiment of a method for conveying priority of buffered frames to power saving stations in a WLAN including an AP and at least one power saving station, the method includes indicating to a station the presence of at least one buffered frame in at least one of legacy buffers and APSD buffers in the AP for the station. The method further includes receiving an indication from the station that the station is ready to receive at least one of the buffered frames for the station. A buffer is then selected for releasing at least one buffered frame to the station. The method also includes determining a number of frames to transmit from the selected buffer, and transmitting the number of frames from the selected buffer to the station. Another aspect of the presently disclosed invention relates to the ability of the station to restrict the length of the service period and to mark uplink frames that cause the start of a service period for a power saving station.

In a particular embodiment of a method for conveying priority of buffered frames to power saving stations in a WLAN including an AP and at least one power saving station, the method includes indicating to a station the presence of at least one buffered frame in at least one of legacy buffers and APSD buffers in the AP for the station. The method further includes receiving an indication from the station that the station is ready to receive at least one of the buffered frames for the station. A buffer is then selected for releasing at least one buffered frame to the station. The method also includes determining a number of frames to transmit from the selected buffer, and transmitting the number of frames from the selected buffer to the station.

Another embodiment of the invention includes an Access Point (AP) comprising a processor, a memory in communication with the processor, a receiver in communication with the processor and with a shared communications channel, a transmitter in communication with the processor and with the shared communications channel. The AP further includes at least one legacy buffer and at least one APSD buffer in communication with the transmitter, wherein the AP indicates to a station the presence of at least one buffered frame in at least one of the legacy buffers and APSD buffers in the AP for the station, and wherein in response to receiving at the receiver an indication from a station that the station is ready to receive at least one of the buffered frames for the station, a buffer is selected for releasing at least one buffered frame to the station, a number of frames to transmit from the selected buffer is determined and the number of frames are transmitted by said transmitter from said buffer to the station.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides mechanisms and techniques for conveying priority of buffered frames to power saving stations in a WLAN as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing mechanisms and techniques for conveying priority of buffered frames to power saving stations in a WLAN as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Avaya Inc. of Lincroft, N.J.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
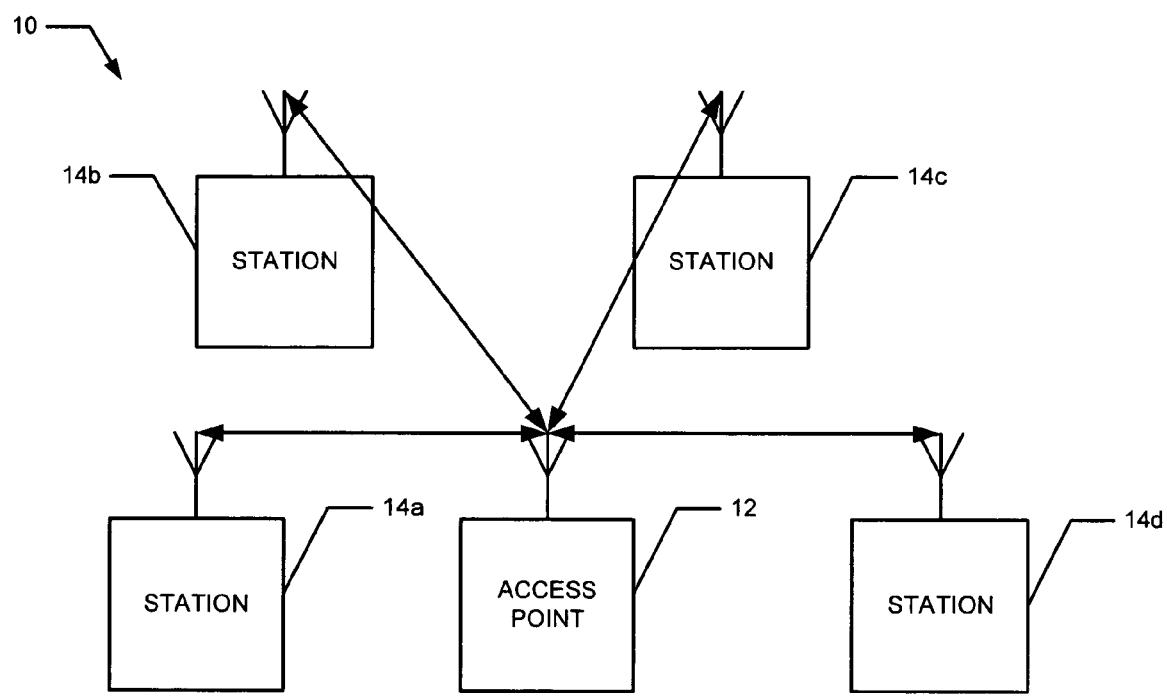
FIG. 1 comprises a block diagram of a particular embodiment of a wireless local area network environment in accordance with aspects of the present invention.

Referring to FIG. 1, a block diagram of a WLAN environment 10 in accordance with the present invention is shown. The environment 10 includes an AP 12 and a plurality of stations 14a-14d. While four stations are shown, it should be appreciated that any number of stations could be used. A station 14a-14d transmits frames over a wireless communications channel to the AP 12. A station 14a-14d is also capable of receiving frames over the wireless communication channel from the AP 12. A station is further capable of entering a power saving (PS) mode and of transmitting and receiving frames while in the power saving mode.

AP 12 receives frames from one or more stations 14a-14d via a wireless communications channel. AP 12 can also transmit frames to one or more stations 14a-14d via a wireless communications channel. AP 12 may further buffer downlink frames for a station which is in a doze state and may deliver the buffered downlink frames to the appropriate station when the station awakens from the doze state.

A station can prolong its battery life by powering off its radio when not transmitting or receiving. A station may be in one of two power management modes, an Active mode or a PS mode. As described above, frames destined for a station in PS mode may be buffered at the AP.

A station in PS mode may elect one of two methods for the delivery of its frames buffered at the AP while in the PS mode. One method is by using PS Polls. In PS polls, a station listens to a TIM to determine if the AP has buffered frames for the station. The station sends a PS Poll to the AP telling the AP that the station is awake. The AP sends a buffered frame to the station. If the frame has the "More Data" bit set, indicating that there are more buffered frames for the station, the station will send another PS Poll to get another buffered frame. This is repeated until the AP has no more frames fro the station.

The other method is by using Automatic Power Saving Delivery (APSD). To use APSD, a station submits a Traffic Specification (TSPEC) request with the field APSD field set to indicate APSD is to be used (e.g. setting the APSD field to a 1). A TSPEC contains an estimate of the data traffic and associated requirements. All buffered frames associated with an admitted APSD TSPEC are transmitted during a service period. There are two types of service periods possible under APSD, unscheduled and scheduled, thus leading to two variants of APSD, namely Unscheduled APSD and Scheduled APSD. Unscheduled APSD can be used only with contention-based access, while Scheduled APSD can be used with both contention-based and polled access. APSD can be combined efficiently with traditional (legacy) power management features to accommodate mixed traffic.

By way of the present invention, priority of the buffered frames and the queue size are indicated to a station. Knowing the priority of the buffered frames enables the station to decide whether to send a frame to retrieve buffered frames waiting at the AP, or to perform other time-critical functions. Knowing the queue size enables the station to decide which power save option to pursue.

It should be noted that in the environment involving the present invention, the TIM has been given an expanded definition. The TIM includes traffic that is to be retrieved by legacy power save method and by Unscheduled APSD. The TIM and the More Data bit indicate whether traffic is buffered at the AP. Since the TIM and the More Data bit reflect all buffered traffic (periodic and non-periodic), stations with non-periodic traffic are able to use Unscheduled APSD to retrieve traffic. As a consequence, the unscheduled power-save method has been enhanced to deal with both periodic and non-periodic traffic.

The AP determines the end of the service period, as it deems appropriate. The AP may consider the priority of buffered frames, the quantity of buffered frames as well as other criteria in determining when to end the service period. It achieves that by the EOSP bit and the generalized TIM and More Data bit definitions, which notifies the station of the presence of frames remaining buffered once the EOSP bit is set by the AP before the buffer of an AC is emptied.

An unscheduled service period begins when the AP receives a Data/Null frame associated with the appropriate AC from the station. If admission control is mandatory for the traffic category of an admitted TSPEC, the service period ends after the AP has attempted to transmit all frames destined for the APSD station and associated with the admitted APSD TSPEC. Otherwise, the service period ends at the discretion of the AP, but not before the AP has attempted to transmit at least one frame destined for the APSD station.

Unscheduled APSD is more efficient than legacy power save for all traffic types, as a single trigger frame can retrieve multiple frames. Downlink frames are released from a triggered PS buffer by a trigger frame. A trigger frame is defined as a QoS-Data or QoS-Null frame, sent uplink by a PS-mode station, in which the User Priority (UP) maps to a trigger-enabled AC. Transmission of trigger frames is not implicitly allowed by admission of a downlink flow. If the trigger frame maps to an AC that has ACM=1, then the station must establish a suitable uplink flow before sending triggers. The combination of sending station and UP uniquely identifies a triggered PS buffer; and the trigger frame causes all frames to be released from that buffer.

The released frames are delivered during a triggered service period. The triggered service period begins after the AP acknowledges the trigger frame transmitted by the station. A frame of any AC may serve as the trigger frame. The AC buffer from which frames will be released is not restricted to be the same as the AC of the trigger frame. The AP would typically release frames from the highest priority AC that contains buffered frames.

The frames released from the triggered PS buffer are delivered using the access parameters of the corresponding AC. The AP uses the EOSP bit that is carried in the QoS Control field to indicate the end of the triggered service period.

It should be clear that, for a particular station, the APSD buffer, the trigger frame, and the triggered service period are all per-AC. Therefore, if a non AP station establishes flows that result in more than one trigger-enabled AC, the station must initiate triggered service periods separately for each such AC in order to retrieve all the buffered frames. The non AP station must remain awake as long as there is at least one triggered service period still in progress. An AC is considered trigger-enabled, for a particular station, if there exists at least one admitted downlink or bi-directional TSPEC with APSD=1 that maps to that AC. Downlink unicast QoS-Data frames associated with a trigger-enabled AC are temporarily held in the AC's triggered PS buffer.

In order for a station to receive call signaling and other control/maintenance frames arriving in an APSD buffer, the TIM and More Data bit indicate the presence of these frames at the AP. When there is a single TIM, the AC buffer from which frames will be released is not restricted to be the same as the AC of the trigger frame. The station cannot tell the AC of buffered frames from the TIM, and hence it may not be able to provide a trigger frame of the same AC as the buffered frames. As long as frames are released from a single triggered buffer per trigger frame, the AP determines the buffer for frame release. The AP preferably release frames from the highest priority AC that contains buffered frames. While the station must retrieve all its buffered frames, using a single TIM (and a single More Data bit) gives rise to ambiguity concerning the AC of the buffered frames, which may cause a problem for devices needing to perform other urgent tasks. With knowledge of the priority of buffered traffic, a station could retrieve top priority frames immediately; while lower priority frames are left to wait.

The use of more TIMs would increase channel overhead, while the use of a longer QoS control field would increase the frame size, neither of which are desirable. The alternative is to add some signaling information in existing fields that are currently transmitted but reserved. The bit(s) in the QoS control field of the DL frame that correspond to Queue Size on an uplink (UL) frame could be used for this signaling. These bits, referred to as Remaining Buffer (RB) bits, indicate whether there is data remaining in the buffer from which the frame was released. RB could be either binary or show the queue size. A station seeing the TIM indication would either wait until its next trigger (UL voice) frame before responding to a TIM indication, or send a trigger frame. The AP would respond with the highest priority frame buffered for the station. With the RB indication, the station has sufficient information to do what is needed.

Figure 2:
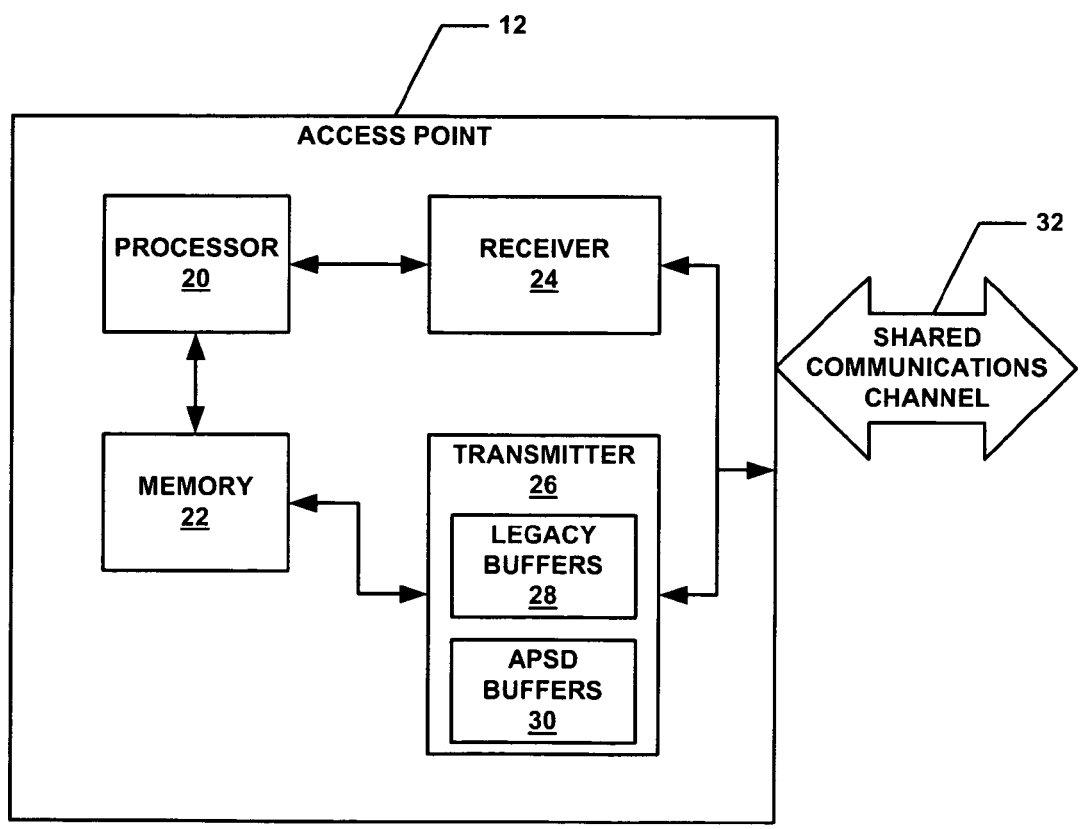
FIG. 2 depicts a block diagram of the salient components of an access point, in accordance with the illustrative embodiment of the present invention.

Referring now to FIG. 2, a block diagram showing salient components of a particular embodiment of an AP is shown. Access point 12 comprises processor 20, memory 22, receiver 24, and transmitter 26, interconnected as shown. Transmitter 26 includes legacy buffers 28 and APSD buffers 30.

Processor 20 is a general-purpose processor that is capable of executing instructions stored in memory 22, of reading data from and writing data into memory 22, and of executing various processes. Memory 22 is capable of storing programs and data used by processor 20, and might be any combination of random-access memory (RAM), flash memory, disk drive, and the like.

Receiver 24 is a circuit that is capable of receiving frames from shared communications channel 32, and of forwarding the received frames to processor 20. Transmitter 26 is a circuit that is capable of receiving frames from processor 20, and of transmitting the frames on shared communications channel 32.

In a particular embodiment of an AP 12, the AP includes a processor, a memory in communication with the processor, a receiver in communication with the processor and with a shared communications channel, and a transmitter in communication with the processor and with the shared communications channel. The transmitter includes at least one legacy buffer 28 and at least one APSD buffer 30.

In operation, the AP indicates to a station the presence of at least one buffered frame in at least one of the legacy buffers and Automatic Power Save Delivery (APSD) buffers in the AP for the station. The indication from the AP top the station may occur by transmitting a TIM within a beacon or by transmitting a More Data bit indication in a downlink frame. When a more data bit is transmitted in a down link frame, the AP may also send a Remaining Buffer (RB) bit. The combination of the More Data bit and the RB bit are used to determine the status of remaining buffered frames at the AP.

Table 1, shown below, described a particular embodiment of the interpretation of the More Data bit and the RB bit.

TABLE 1

| RB bit | More Data bit | Interpretation |
| --- | --- | --- |
| 0 | 0 | No more frames remain buffered at the AP |
| 0 | 1 | Frames of lower priority than the received frame remain buffered at the AP |
| 1 | 0 | Not meaningful |
| 1 | 1 | Frames of comparable priority to the received frame remain buffered at the AP |

As shown in table 1, when the More Data bit is set to a zero, there are no more frames remaining buffered at the AP. When the More Data bit is set to a one and the RB bit is set to a zero, there are frames of lower priority than the received frame remaining buffered at the AP. When More Data bit is set to a one and the RB bit is set to a one, there are frames of comparable priority to the received frame remaining buffered at the AP.

The AP receives an indication at the receiver that the station is awake and ready to receive at least one of the buffered frames for the station. This may be accomplished, for example, by the AP receiving a trigger frame. A trigger frame may any uplink frame from the station, or an uplink frame from the station with a special marker. An example of a marker for a trigger frame would be a non-zero Max SP Length. The Max SP Length is a field in an uplink frame sent by a power-saving station, indicating the maximum number of frames buffered for the station at the AP to be sent in the next service period. The ability to limit the maximum length of the service period enables a station to (a) limit the length of the time interval it must be awake receiving frames buffered at the AP and (b) to enable transmission of uplink frames without having to stay awake until it receives a frame from the AP allowing it to go back to sleep. The AP then selects a buffer for releasing at least one the buffered frame to the station. The AP selects the buffer having a highest priority level and containing buffered frames. The number of frames to transmit from the selected buffer is determined and the number of frames are transmitted by the transmitter from the selected buffer to the station. The number of frames are transmitted using Unscheduled APSD for non-periodic traffic. The AP performs Unscheduled APSD for non-periodic traffic when an AC of the traffic has an admitted APSD TSPEC. When there is a single TIM, the AP transmits frames from a buffer associated with an AC which is different than the AC associated with the trigger frame. The AP chooses the buffer for frame release as long as frames are released from a single triggered buffer per trigger frame.

Figure 3A:
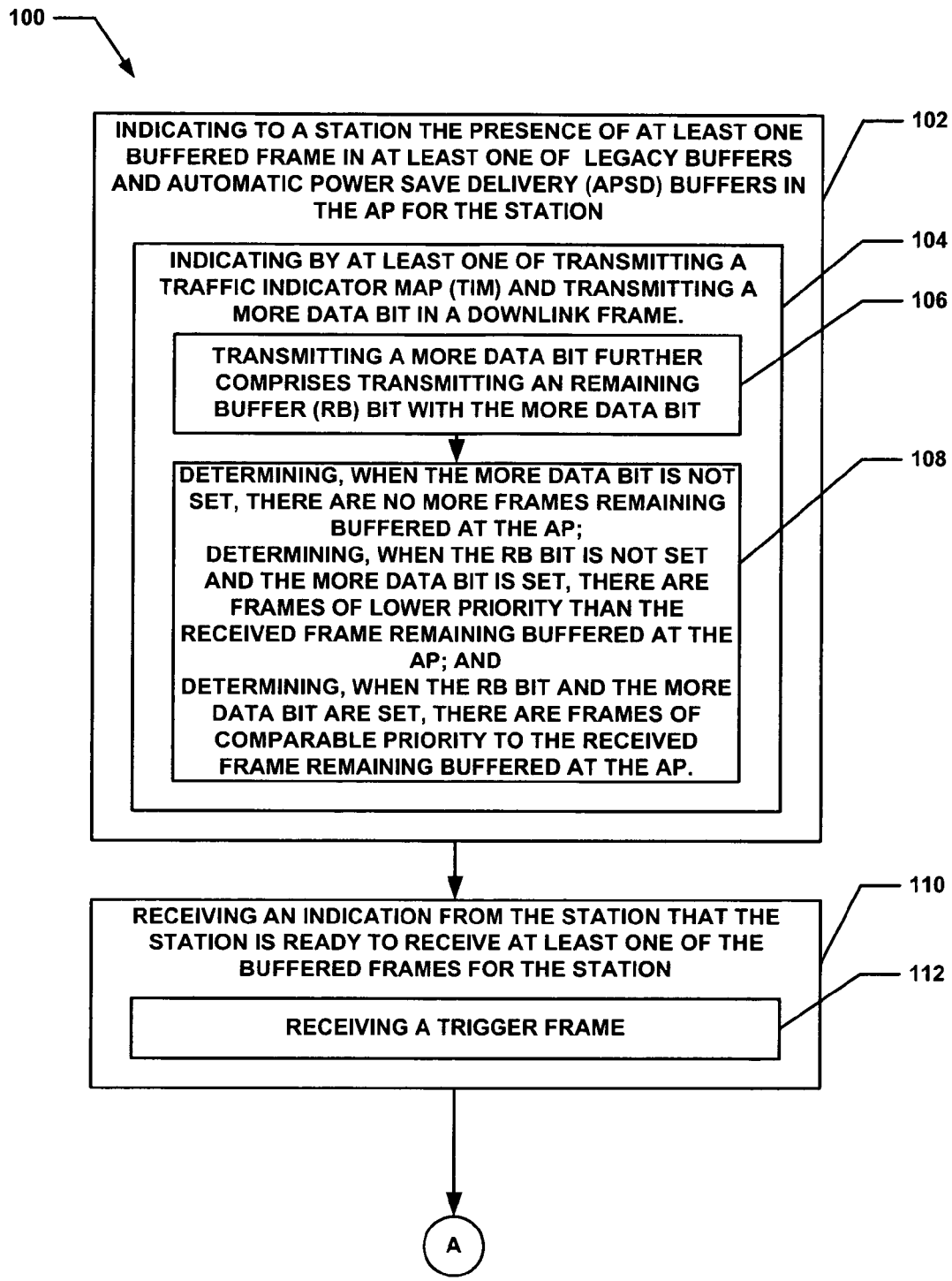
FIGS. 3A and 3B comprise flow diagrams of a particular embodiment of a method for conveying the priority of buffered frames to power saving stations in wireless local area networks in accordance with aspects of the present invention.
Figure 3B:
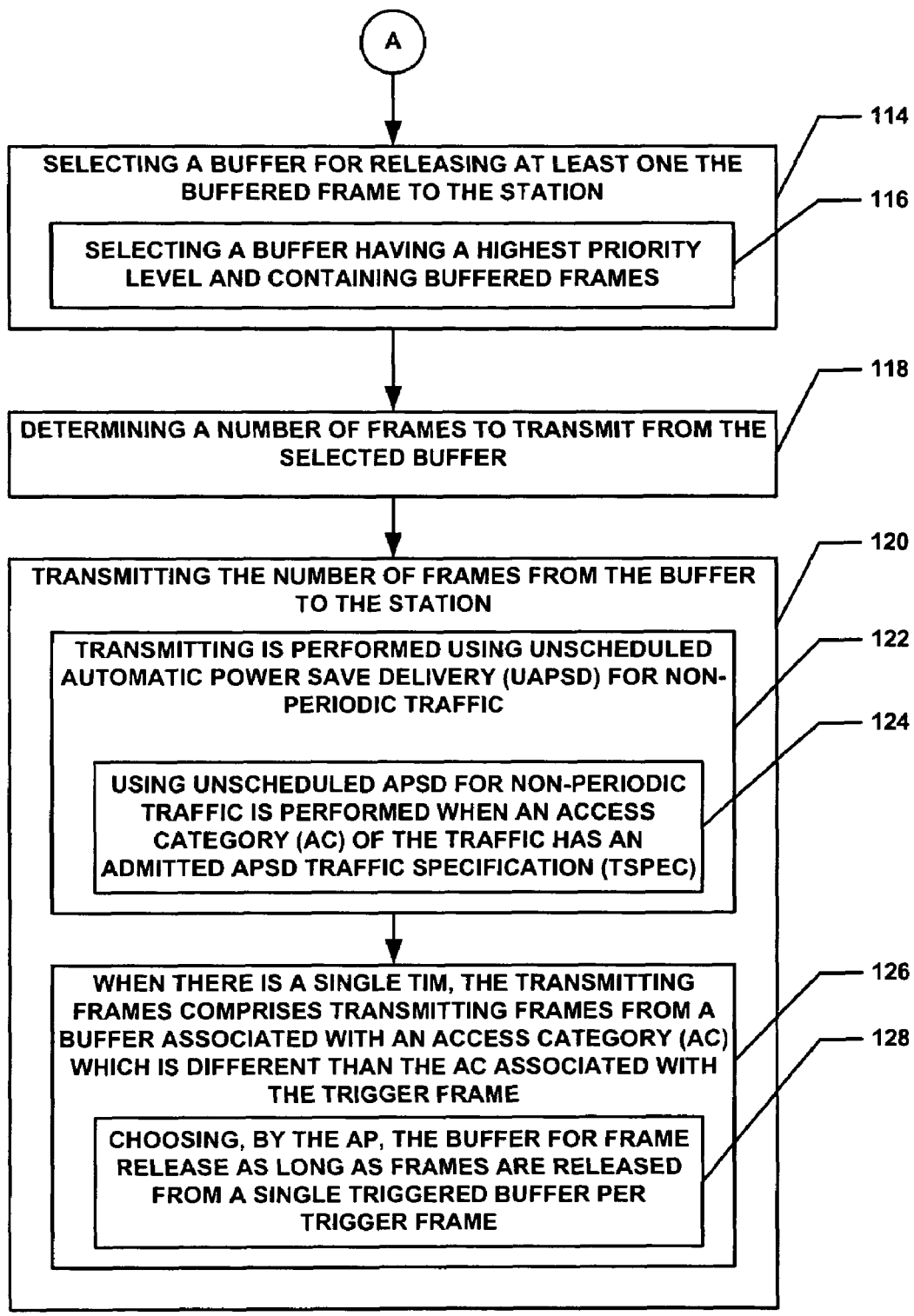

A flow chart of the presently disclosed method is depicted in FIG. 3. The rectangular elements are herein denoted "processing blocks" and represent computer software instructions or groups of instructions. Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

It is to be understood that embodiments of the invention include the applications (i.e., the un-executed or non-performing logic instructions and/or data) encoded within a computer readable medium such as a floppy disk, hard disk or in an optical medium, or in a memory type system such as in firmware, read only memory (ROM), or, as in this example, as executable code within the memory system (e.g., within random access memory or RAM).

Referring now to FIG. 3, a method 100 for conveying priority of buffered frames to power saving stations in a WLAN including an AP and at least one power saving station is shown. The method begins with processing block 102 wherein the presence of at least one buffered frame in at least one of legacy buffers and APSD buffers in the AP for the station is indicated.

In processing block 104, the indicating is done by at least one of transmitting a TIM and transmitting a More Data Bit in a downlink frame. In processing block 106, transmitting a More Data Bit further comprises transmitting a Remaining Buffer (RB) bit with the More Data bit. As shown in processing block 108, the More Data bit and the RB bit are analyzed. When the More Data bit is not set, there are no more frames remaining buffered at the AP. When the RB bit is not set and the More Data bit is set, there are frames of lower priority than the received frame remaining buffered at the AP. When the RB bit and the More Data bit are set, there are frames of comparable priority to the received frame remaining buffered at the AP.

In processing block 110, an indication is received from the station informing the AP that the station is ready to receive at least one of the buffered frames for the station. As recited in processing block 112, the receiving an indication comprises receiving a trigger frame.

In processing block 114 a buffer is selected for releasing at least one buffered frame to the station. As shown in processing block 116, selecting a buffer comprises selecting a buffer having a highest priority level and containing buffered frames.

In processing block 118, the number of frames to transmit from the selected buffer is determined. This determination may take into account the priority of the buffered frames, the number of buffered frames, as well as other criteria.

As shown in processing block 120 the number of frames determined in processing block 118 are transmitted from the buffer to the station. As recited in processing block 122, the transmitting is performed using Unscheduled APSD for non-periodic traffic. Further, as shown in processing block 124, using Unscheduled APSD for non-periodic traffic is performed when an AC of the traffic has an admitted APSD TSPEC. Further still, as recited in processing block 126, when there is a single TIM, frames are transmitted from a buffer associated with an AC which is different than the AC associated with the trigger frame. In processing block 128, the AP determines the buffer for frame release as long as frames are released from a single triggered buffer per trigger frame.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A method of conveying priority of buffered frames to power saving stations in a Wireless Local Area Network (WLAN) including an Access Point (AP) and at least one power saving station, the method comprising:

indicating to a station the presence of at least one buffered frame in at least one of legacy buffers and Automatic Power Save Delivery (APSD) buffers in the AP for the station, wherein said indicating is done by at least one of transmitting a Traffic Indicator Map (TIM) and transmitting a More Data Bit in a downlink frame;

receiving an indication from the station that the station is ready to receive at least one of the buffered frames for the station;

selecting a buffer for releasing at least one said buffered frame to the station;

determining a number of frames to transmit from the selected buffer;

transmitting said number of frames from said buffer to said station, wherein said transmitting a More Data Bit further comprises transmitting an Remaining Buffer (RB) bit with said More Data bit;

determining, when said More Data bit is not set, there are no more frames remaining buffered at said AP;

determining, when said RB bit is not set and said More Data bit is set, there are frames of lower priority than the received frame remaining buffered at the AP; and determining, when said RB bit and said More Data bit are set, there are frames of comparable priority to the received frame remaining buffered at the AP.

2. The method of claim 1 wherein said selecting a buffer comprises selecting a buffer having a highest priority level and containing buffered frames.

3. The method of claim 1 wherein said transmitting is performed using Unscheduled APSD for non-periodic traffic.

4. The method of claim 3 wherein said using Unscheduled APSD for non-periodic traffic is performed when an Access Category (AC) of the traffic has an admitted APSD Traffic Specification (TSPEC).

5. The method of claim 1 wherein said receiving an indication comprises receiving a trigger frame.

6. The method of claim 1 wherein, when there is a single TIM, said transmitting frames comprises transmitting frames from a buffer associated with an AC which is different than the AC associated with the trigger frame.

7. The method of claim 6 further comprising choosing, by said AP, the buffer for frame release as long as frames are released from a single triggered buffer per trigger frame.

8. An Access Point (AP) comprising:
a processor;
a memory in communication with said processor;
a receiver in communication with said processor and with a shared communications channel;
a transmitter in communication with said processor and with said shared communications channel;
at least one legacy buffer and at least one Automatic Power Save Delivery (APSD) buffer in communication with said transmitter, wherein said AP indicates to a station the presence of at least one buffered frame in at least one of the legacy buffers and APSD buffers in the AP for the station, and wherein in response to receiving at said receiver an indication from the station that the station is ready to receive at least one of the buffered frames for the station, a buffer is selected for releasing at least one said buffered frame to the station, a number of frames to transmit from the selected buffer is determined and said number of frames are transmitted by said transmitter from said buffer to said station, wherein said AP indicates the presence of buffered frames by at least one of transmitting a Traffic Indicator Map (TIM) and transmitting a More Data Bit in a downlink frame, wherein said transmitting a More Data Bit further comprises said AP transmitting a Remaining Buffer (RB) bit with said More Data bit;

wherein said AP resets said More Data when there are no more frames remaining buffered at said AP;

wherein said AP sets said More data bit and resets said RB bit when there are frames of lower priority than the received frame remaining buffered at the AP; and wherein said AP sets said More Data bit and said RB bit when there are frames of comparable priority to the received frame remaining buffered at the AP.

9. The AP of claim 8 wherein said buffer is selected having a highest priority level and containing buffered frames.

10. The AP of claim 8 wherein said number of frames are transmitted using Unscheduled APSD for non-periodic traffic.

11. The AP of claim 10 wherein said AP performs Unscheduled APSD for non-periodic traffic when an Access Category (AC) of the traffic has an admitted APSD Traffic Specification (TSPEC).

12. The AP of claim 8 wherein said receiving an indication comprises receiving a trigger frame at said receiver.

13. The AP of claim 12 wherein, when there is a single TIM, said AP transmits frames from a buffer associated with an Access Category (AC) which is different than the AC associated with the trigger frame.

14. The AP of claim 13 wherein said AP chooses the buffer for frame release as long as frames are released from a single triggered buffer per trigger frame.

* * * * *